(No Model.) 2 Sheets—Sheet 1.
T. A. WEBER.
WEIGHING SCALE.
No. 361,246. Patented Apr. 12, 1887.
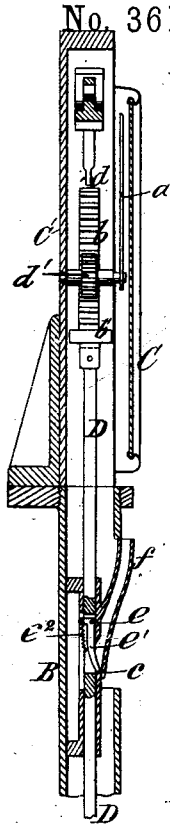
Fig. 2.
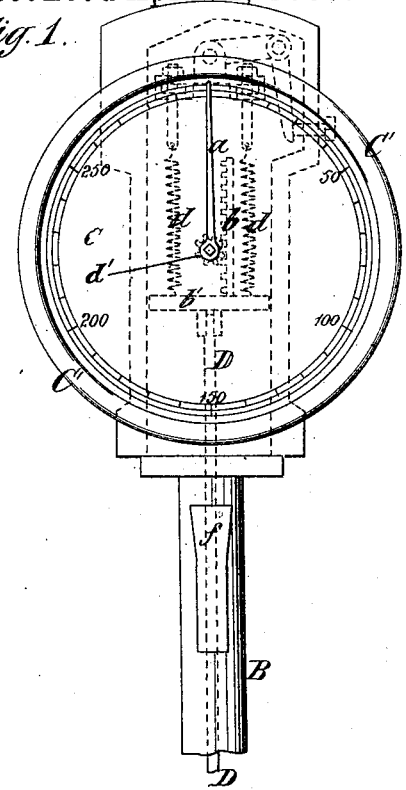
Fig. 1.
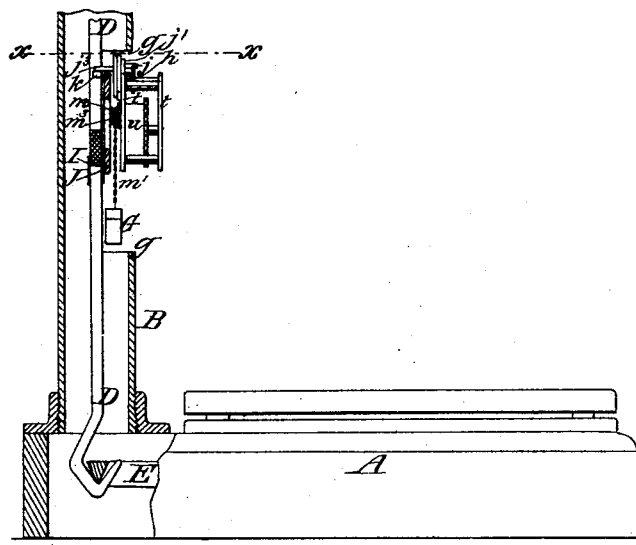
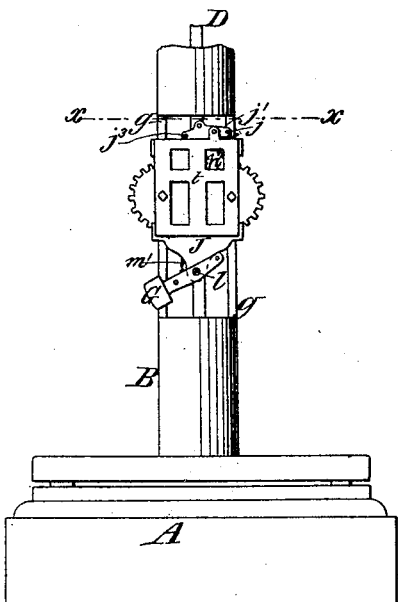
Witnesses:
C. E. Sundgren
Emil Petter
Inventor:
Theodore A. Weber
by his attorneys
Brown & Hall (No Model.) 2 Sheets—Sheet 2.
T. A. WEBER.
WEIGHING SCALE.
No. 361,246. Patented Apr. 12, 1887.
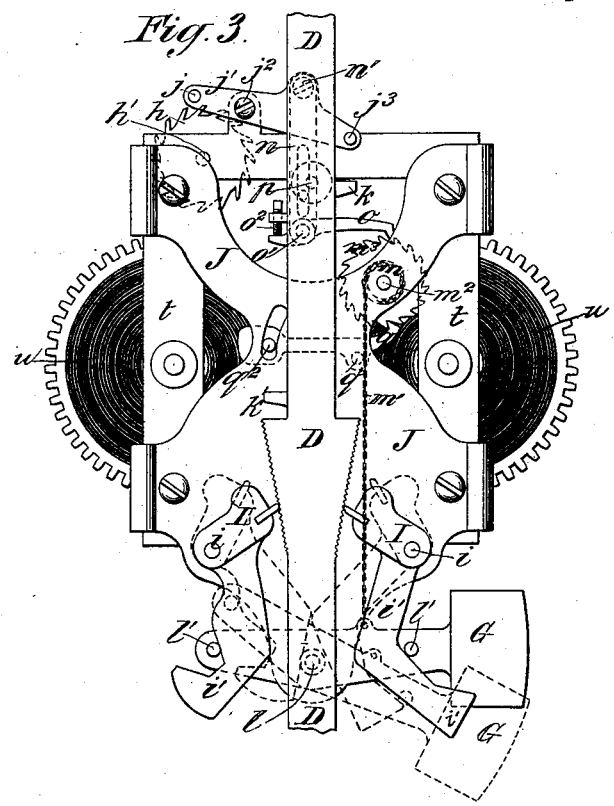
Fig. 3.
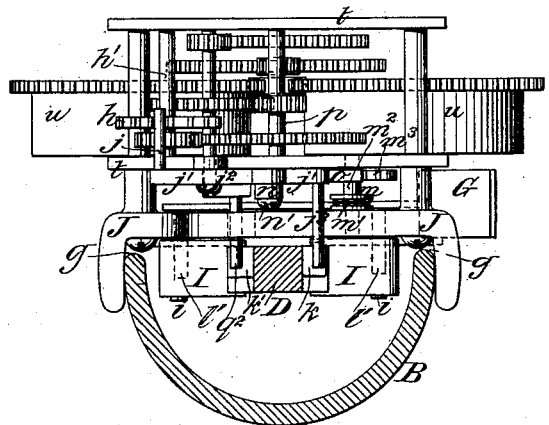
Fig. 4.
Fig. 5.
Witnesses:
Inventor:
Theodore A. Weber
by his attorneys

UNITED STATES PATENT OFFICE.

THEODORE A. WEBER, OF NEW YORK, N. Y. ASSIGNOR, BY MESNE ASSIGNMENTS, TO BILLOP S. BENNETT, OF SAME PLACE.

WEIGHING-SCALE.

SPECIFICATION forming part of Letters Patent No. 361,246, dated April 12, 1887.

Application filed November 29, 1886. Serial No. 220,104. (No model.)

*To all whom it may concern:*

Be it known that I, THEODORE A. WEBER, a citizen of the United States, residing in the city and county of New York, in the State of New York, have invented a new and useful Improvement in Scales for Weighing, of which the following is a specification, reference being had to the accompanying drawings.

This invention relates to that class of scales which when nothing is placed on them to be weighed are automatically locked with the index at zero, and which require to be unlocked before weighing can be performed, such scales being generally intended for the weighing of persons in public places, and to be unlocked by means of a coin, which is used as a key, and which is deposited in a part of the scale as payment for the privilege of weighing.

The object of this improvement is to prevent repetition of the weighing, or the weighing of more than one person or load by one payment, or after only once unlocking the scale, by compelling the return of the index of the scale to zero and the relocking of the scale after every weighing, so that before the weighing can be repeated the scale must be again unlocked by dropping in a new coin; and my invention consists in certain means hereinafter described and claimed, whereby the above-mentioned object is accomplished.

Figure 1 in the accompanying drawings represents a front elevation of a spring-platform scale having my invention applied. Fig. 2 represents an elevation at right angles to Fig. 1, mostly in section. Fig. 3 is a front view, on a larger scale, of the means of preventing the repetition of the weighing, which constitutes the principal feature of my invention. Fig. 4 is a horizontal sectional view corresponding with Fig. 3 in the line $x\ x$ of Figs. 1 and 2. Fig. 5 is a front view of certain of the details which are concealed in Fig. 3.

Similar letters of reference designate corresponding parts in the several figures.

A designates the base of the scale, and B the hollow column, which supports the case C′, containing the dial C and the indicating mechanism, the said column being represented in Figs. 1 and 2 as being partly broken away to reduce the height of the figures.

D designates the rod through which connection is made between the platform and the index $a$. This rod is represented as connected at its lower end with the lever E in the base of the scale, and carrying at its upper end a cross-head, $b'$, to which is attached a rack, $b$, gearing with a pinion, $d'$, on the arbor of the index $a$, the said cross-head also having applied to it the springs $d\ d$, by which the platform and its load are counterbalanced, as may be understood by reference to Figs. 1 and 2.

As thus far described the drawings represent a spring-platform scale such as in common use, but which serves as well as any other to illustrate the application of my invention.

The lock which is employed to lock the scale with the index at zero when there is no load on the platform may be of any suitable kind. It is represented in Fig. 2 as consisting of an elbow-shaped tumbler, $e'$, pivoted at $e$ to the rod or connection D, and having applied to it a light spring, $e^2$, which, when the rod or connection D arrives in its highest position and the index at zero, forces the said tumbler to a position in which its lower end rests on a fixed shoulder, $c$, provided within the hollow column B, and so prevents the said rod or connection from descending until the said tumbler is pressed out of contact with the said shoulder by the pressure against it of a coin inserted through a proper opening or channel, $f$, on the column, after which the rod or connection is free to be moved down and allowed to operate the index by the weight of a person or load on the platform. As this means of locking and unlocking the scale do not of themselves constitute a part of my invention, I consider further explanation of them unnecessary, except to say that a scale locked by such a device when once unlocked by a coin might be used to weigh as many persons as might successively get on the platform, provided each one did not get off the scale until the next one got on, and hence an unlimited number of persons in collusion might be weighed for one fee, and this, it should be understood, is what is to be prevented by my invention, which I will now proceed to describe.

To the hollow column B, opposite to a suitable opening, $g\ g$, provided therein, is secured a small frame, J, to which are pivoted at $i\ i$ two dogs, I I, the purpose of which is to bite the rod or connection D, and arrest it every time it has been brought to its lowest position by the weight of a person or load on the scale-platform. The said frame has also attached to it a motor of a suitable kind, which is independent of the weighing mechanism—as, for instance, a spring clock movement, such as is represented, and of which $t\,t$ designate the framing and $u\,u$ the springs—the object of said motor being to bring the dogs I I into operation on the rod D. The said motor has an escape-wheel, $h$, which, while the scale is at rest without a load, is engaged by a stop-pin, $j$, provided on one end of a small lever, $j'$, which is pivoted at $j^2$ to the framing of the motor, the other end of the said lever, which is the heavier, being then held up to produce the engagement with the wheel by means of a projection or locking-piece, $k$, on the said rod operating on and supporting or holding up a pin, $j^3$, on the other end of the stop-lever $j'$. While the motor is so locked, which is only while the scale is without a load, the dogs are held open, as shown in dotted outline in Fig. 3, by the weight of a loaded lever, G, which is pivoted to the frame J at $l$, and which carries pins $l'\,l'$, which operate on tail-pieces $i'\,i'$, provided on the dogs I I. This loaded lever G is connected by a chain or cord, $m'$, with a little winch, $m$, which is journaled at $m^2$ in the frame J, and which, every time the motor is unlocked by the removal of the locking-piece $k$ of the rod D from the pin $j^3$ of the lever $j$, is set in motion by the motor to wind up the chain $m'$, and so lift the loaded lever G and produce the closing of the dogs I I on the rod D, as shown in bold outline in Fig. 3, by means of the cam-like action of the pins $l'\,l'$ of the said lever on the tail-pieces $i'\,i'$ of the dogs.

The winch is operated to wind up the chain by the means described, as follows: On the arbor $m^2$ of the winch $m$ is provided a ratchet-wheel, $m^3$, which is engaged by a pawl, $o$, which is pivoted at $o'$ to a slotted lever, $n$, which is hung on a fulcrum-pin, $n'$, secured in the stop-lever $j'$, and in the slot of which works a crank-wrist, $p'$, carried by the fast-moving arbor $p$ of the motor, from which the faster-moving arbor $h'$ of the escape-wheel $h$ derives motion. The operation of this crank-wrist in the slot of the lever $n$ produces a vibration of the said lever, and so causes the pawl to turn the ratchet-wheel $m^3$ and the winch. The rising and falling movement of the pawl with respect to the slotted lever $n$ is limited by an adjustable stop-screw, $o^2$, in the said lever to what is sufficient to let the said pawl rise high enough to pass over the teeth of the ratchet-wheel, so that the said pawl may be lifted entirely clear of the ratchet-wheel when the pin $j$ of the stop-lever $j'$ is thrown into action on the escape-wheel to lock the motor. There is also a stop-pawl, $q$, pivoted to the frame J at $q'$ to hold the ratchet-wheel in winding up the chain $m'$. The stop-pawl is furnished with a pin, $q^2$, which, when the scale is unloaded, is held up by a projection, $k'$, on the rod D.

It will thus be understood that while the scale is unloaded and the motor locked both the pawls $o$ and $q$ are clear of the ratchet-wheel and the winch is free, so that the chain is unwound from it by the weight of the loaded lever G, which also produces the opening of the dogs or their removal out of the way of the rod D.

The motor is timed to wind up the chain and bring the dogs into operation to grip the rod D very quickly—say in less than ten seconds after being unlocked at $c\,e'$.

To provide for the surer gripping of the rod D by the dogs, the part of the rod between them is toothed or roughened, and these toothed or roughened parts are preferably tapered downward, as shown in Fig. 3, so that they will tend to wedge between the dogs and increase the bite as soon as they arrive in contact with the dogs, by reason of the point of the bite being above the pivots $i\,i$ of the dogs; but this taper is not absolutely necessary, although the point of bite of the dogs should be as described.

Having now described the construction and function of the several parts employed to carry out my invention, I will proceed to describe their operation in weighing.

I will first suppose the scale to be unloaded, the rod D being then in its highest position, and its locking-piece $k$ and projection $k'$ to be then holding the stop-lever $j'$, with its stop-pin $j$ locking the escape-wheel $h$, and also holding up the two pawls $o$ and $q$ out of gear with the ratchet-wheel, and the dogs to be held apart by the loaded lever G.

When a person unlocks the scale at $c\,e'$ by the dropping in of a coin or insertion of a key, and gets on the platform, the latter quickly descends and the index moves to the point on the dial to indicate the weight. As soon as the person begins to bear on the platform and the rod moves downward, which it will be caused to do by a very slight pressure on the platform, the motor is unlocked, and the pawls $o\,q$ are allowed to come in gear by the removal of the locking-piece $k$ and projection $k'$ from the pins $j^3$ and $q^2$, and the motor is consequently allowed to come into operation. By the time the index of the scale has steadied itself opposite the proper point on the dial to indicate the weight, the winch, operated by the motor, has wound up the chain and caused the loaded lever G to make the dogs I I bite the rod D, which is thus so arrested that its farther descent is positively prevented, even by an additional or a heavier person getting on the scale, as the more weight is applied the harder will be the bite. When the person gets off the scale, the rod D will rise very quickly under the influence of the scale-springs $d$, and be locked again by the tumbler $e'$ engaging with the fixed shoulder $c$, so that the weighing cannot be repeated until the rod is unlocked by dropping in another coin or using a key to press back the tumbler. The dogs freely permit this rise of the rod, as the tendency of the rod to rise loosens the dogs by reason of their bite being above their centers of motion. Just as the rod D is about to complete its ascent its locking-piece $k$ will operate on the stop-lever $j'$ to lift the pawl $o$, its projection $k'$ will produce the depression of the operative end of the pawl $q$, and so leave the ratchet-wheel and winch free, and by the time the said rod D completes its ascent the stop-lever will have stopped the motor by the action of its pin $j$ on the escape-wheel, and the dogs I I will have been thus disconnected or ungeared from the motor. As soon as the winch is liberated, and the dogs I I are thereby ungeared from the motor, the weighted lever G is allowed to fall and open the dogs. The raising of the rod D takes place so quickly that one person could not get off and another person get on the scale before the locking of the rod or connection D at the point $c$ $e'$ would take place, and in case of a lighter person than the one just weighed attempting to get weighed by getting on the scale before the latter had got off the rod D would rise so quickly under the influence of the quick recoil of the scale-springs $d$ that on the heavier person getting off the rod would pass above and the index pass beyond the points for weighing the lighter one; and if this recoil should not carry back the rod to the locking-point, the weight of the person on the scale, on regaining its influence over the scale-springs and tending to produce the descent of the rod again, would cause the dogs I I to bite the rod and prevent its further descent to the weighing-point, for the said dogs will remain in contact with the rod, so that they would instantly stop its descent at any time before the loaded lever could be allowed to fall and carry them free from the rod, and this cannot occur until the rod shall have unlocked the pawl $o$, and allow the windlass to turn back and the chain $m'$ to unwind from it. Thus it may be seen that there are no conditions under which it is possible or at least practicable for more than one person or load to be weighed without unlocking the scale for every weighing, and if the locking and unlocking device, such as the tumbler $e'$, is so protected that it can only be moved by inserting a coin or key, the surreptitious repetition of weighing is effectually prevented.

What I claim as my invention, and desire to secure by Letters Patent, is—

1. The combination, in a weighing-scale, with the platform and index thereof and a connection between them, of a device for arresting the said connection in the position to which it has been brought in weighing, a motor independent of the weighing mechanism for operating said arresting device, a stop for said motor, a lock for locking said connection at the zero position, and a locking-piece provided on said connection to lock the said stop and keep the motor locked while the scale is locked, substantially as herein described.

2. The combination, with the platform, the index, and the connection D between them, of the dogs I I, for gripping said rod, the lever G, for opening and closing said dogs, the winch $m$ and chain $m'$, for operating said lever, and a motor independent of the weighing mechanism of the scale for operating said winch, all substantially as herein described.

3. The combination, with the platform, the index, and the connection D between them, of a locking device, as $e'$, attached to said connection for locking the scale at zero, dogs I I, for arresting the said rod where it is brought by the weighing operation, a motor independent of the weighing mechanism of the scale, and connections with said motor for bringing said dogs to the position to so arrest the rod, a stop for said motor, and a locking-piece, as $k$, on the said connection D, for locking the said stop and for ungearing the motor from the said dogs, all substantially as herein described.

THEODORE A. WEBER.

Witnesses:
FREDK. HAYNES,
HENRY J. McBRIDE.